(12) United States Patent
Asanuma et al.

(10) Patent No.: US 8,136,452 B2
(45) Date of Patent: Mar. 20, 2012

(54) GAS GENERATOR

(75) Inventors: Junichi Asanuma, Aichi-ken (JP);
Kengo Nakashima, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 244 days.

(21) Appl. No.: 12/585,525

(22) Filed: Sep. 17, 2009

(65) Prior Publication Data
US 2010/0071581 A1     Mar. 25, 2010

(30) Foreign Application Priority Data
Sep. 25, 2008   (JP) .................... 2008-246697

(51) Int. Cl.
*C06D 5/00* (2006.01)
(52) U.S. Cl. ..................................... 102/530
(58) Field of Classification Search ............. 102/530, 102/531; 280/736, 737, 741
See application file for complete search history.

(56) References Cited

U.S. PATENT DOCUMENTS

| | | | |
|---|---|---|---|
| 5,669,629 A | 9/1997 | Rink | |
| 5,763,817 A | 6/1998 | Renfroe et al. | |
| 5,884,938 A | 3/1999 | Rink et al. | |
| 5,941,562 A | 8/1999 | Rink et al. | |
| 6,062,599 A * | 5/2000 | Forbes et al. | 280/737 |
| 6,117,254 A | 9/2000 | Rink et al. | |
| 6,170,867 B1 | 1/2001 | Rink et al. | |
| 6,221,186 B1 | 4/2001 | Rink et al. | |
| 6,244,623 B1 * | 6/2001 | Moore et al. | 280/737 |
| 6,274,064 B1 * | 8/2001 | Wheatley | 252/186.21 |
| 6,332,404 B1 * | 12/2001 | Rink et al. | 102/530 |
| 6,338,500 B1 | 1/2002 | Perotto | |
| 6,382,668 B1 * | 5/2002 | Goetz | 280/737 |
| 6,634,302 B1 | 10/2003 | Rink et al. | |
| 6,673,173 B1 | 1/2004 | Mendenhall et al. | |
| 7,131,663 B1 | 11/2006 | Campbell et al. | |
| 7,520,531 B2 * | 4/2009 | Gammill | 280/737 |
| 2002/0145275 A1 * | 10/2002 | Hosey et al. | 280/741 |
| 2005/0006887 A1 * | 1/2005 | Barker et al. | 280/741 |
| 2005/0189750 A1 | 9/2005 | Gotoh et al. | |
| 2005/0212272 A1 * | 9/2005 | Fogle, Jr. | 280/737 |
| 2008/0069740 A1 * | 3/2008 | Kitayama et al. | 422/163 |

(Continued)

FOREIGN PATENT DOCUMENTS
JP    A-2002-029358    1/2002
JP    A-2002-514145    5/2002

*Primary Examiner* — Michael Carone
*Assistant Examiner* — Samir Abdosh
(74) *Attorney, Agent, or Firm* — Posz Law Group, PLC

(57) ABSTRACT

In a gas generator of the invention, a closure member is disposed so as to be connected to an outer circumferential wall side along a circumferential edge thereof in a housing and to close an outlet port which is formed in a ceiling wall of the housing. Thin breakable portions adapted to be broken when a squib is activated are formed in the closure member so as to extend substantially radially from a center of the closure member in a rectilinear fashion. When the squib 19 is activated, the breakable portions are broken, whereby portions of the closure member 11 which lie between the breakable portions are individually made to be opened radially. A stopper portion is formed on a closure member side surface of the ceiling wall such that the opened door portions are brought into abutment therewith so that the opening angles of the door portions become less than 90° while ensuring an angle at which combustion gas is allowed to flow out.

4 Claims, 5 Drawing Sheets

U.S. PATENT DOCUMENTS

2008/0111358 A1* 5/2008 Jackson et al. ............... 280/741
2009/0058059 A1* 3/2009 Young et al. ................. 280/737
2009/0283995 A1* 11/2009 Smith et al. .................. 280/735
2011/0079992 A1* 4/2011 Stevens ........................ 280/741

* cited by examiner

GAS GENERATOR

BACKGROUND OF THE INVENTION

1. Field of the Invention

The present invention relates to a gas generator configured to have a housing of which an interior is filled with gas generating agents which generate gas when combusting and a squib accommodated within the housing for igniting the gas generating agents.

2. Related Art

Conventionally, as a gas generator, there was a gas generator having a squib accommodated on a proximal portion side thereof. This gas generator also included an outer circumferential wall which was made to extend from the squib and a ceiling wall adapted to close the outer circumferential wall at a distal end of the outer circumferential side, and gas generating agents were filled in the squib between the outer circumferential wall and the ceiling wall. In this conventional gas generator, an outlet hole was formed substantially at the center of the ceiling wall which was disposed to face the squib so that combustion gas generated when the squib was activated was allowed to flow out therethrough, and this outlet hole was closed by a closure member which could cut off ventilation between the inside and outside of the housing. Then, when the squib was activated, the closure member was broken to open the outlet port, whereby combustion gas generated as a result of combustion of the gas generating agents was allowed to flow out through the outlet port so opened (for example, refer to JP-A-2002-514145).

In gas generators of this type, since the detonation force resulting when the squib was activated to ignite the gas generating agents was large, there were situations in which the whole of the closure member was separated to be scattered when the squib was activated. Because of this, in a case where this gas generator is accommodated within the housing for use as an actuator for an inflator which generates an air bag inflation gas, there is caused a fear that the scattered pieces of the closure member flow out from the gas outlet hole in the inflator together with the inflation gas, and therefore, it is desirable to prevent as much as possible the scattering of the closure member in the way described above.

SUMMARY OF THE INVENTION

The invention has been made with a view to solving the problem, and an object thereof is to provide a gas generator which can prevent the scattering of a closure member when activated.

With a view to attaining the object, according to an aspect of the invention, there is provided a gas generator having a housing of which an interior is filled with gas generating agents which generates gas when combusting and a squib stored within the housing for igniting the gas generating agents, the housing constructed to accommodate the squib on a proximal portion and comprising an outer circumferential wall configured to extend from the squib and a ceiling wall adapted to close the outer circumferential wall on a distal end of the circumferential wall and disposed so as to face the squib, with the gas generating agents filled between the outer circumferential wall lying on a distal end of the squib and the ceiling wall, an outlet hole being formed substantially at a center of the ceiling wall through which combustion gas generated when the squib is activated is allowed to flow out, a closure member, which is made able to cut off ventilation between an inside and outside of the housing and breakable when the squib is activated, being disposed so as to close the outlet hole, wherein the closure member is thin-walled and is connected to the outer circumferential wall along a circumferential edge thereof so as to separate the gas generating agents from the ceiling wall in the interior of the housing, wherein thin breakable portions, which are breakable when the squib is activated, are formed in the closure member so as to extend substantially radially from a center thereof in a rectilinear fashion, wherein portions of the closure member which lie between the breakable portions are individually made to open as door portions radially about positions in the vicinity of the outer circumferential wall by the breakable portions being broken when the squib is activated, and wherein a stopper portion is formed on a surface of the ceiling wall which lies on the closure member so as to restrict the opening of the door portions so that an angle at which the door portions are opened becomes less than 90° while ensuring an angle at which the combustion gas can flow out by the door portions so opened being made to be brought into abutment therewith.

In the gas generator according to the aspect of the invention, since the stopper portion is formed on the ceiling wall of the housing which is disposed to lie on the distal end when the door portions provided on the closure member are opened so as to restrict the opening of the door portions so that the opening angle of the door portions becomes less than 90°, even though there is caused a situation in which the door portions provided in the closure member are forced to be opened by receiving the detonation force produced when the squib is activated to ignite the gas generating agents, the door portions are only allowed to be opened at the angle less than 90°. In addition, in the event of the opening angle being less than 90°, centrifugal force can be suppressed, and it becomes difficult for stress to be concentrated to the portions lying in the vicinity of the outer circumferential wall about which the door portions are opened. Therefore, the separation of the door portions from the outer circumferential wall can be prevented. Because of this, in the gas generator according to the aspect of the invention, the separation and scatter of the opened door portions from the outer circumferential wall can be prevented accurately, whereby the ruptured door portions can be prevented from flowing out through the outlet hole together with combustion gas generated when the gas generating agents combustion. In addition, in the gas generator according to the aspect of the invention, the door portions provided in the closure member are made to be opened while ensuring the angle at which the combustion gas is allowed to flow out. In other words, in the gas generator according to the aspect of the invention, the stopper portion provided on the ceiling wall of the housing prevents the excessive opening of the door portion while allowing for the necessary opening operation of the door portion for permitting the flowing out of combustion gas, thereby making it possible to cause combustion gas to flow out from the outlet hole quickly when the squib is activated.

Consequently, in the gas generator according to the aspect of the invention, the scatter of the closure member can be prevented when the gas generator is activated.

In addition, it is desirable to use the gas generator configured in the way described above in a hybrid-type inflator having:

a case portion of which an interior is filled with a pressurized gas for generating an inflation gas for inflating an air bag and which includes a gas discharge port which is closed by a rupture plate; and an actuator welded to the case portion and adapted to cause the pressurized gas filled within the interior of the case portion to be discharged from the gas discharge port by rupturing the rupture plate when actuated, as the actuator.

When the gas generator of the invention is used as the actuator, since the scatter of the door portions can be prevented, the ruptured pieces of the door portions of the closure member can be prevented from flowing out into the air bag together with the inflation gas which is discharged from the gas discharge port in the inflator. Because of this, the filter can be omitted which has conventionally be provided in the vicinity of the gas discharge port, whereby the weight of the inflator can be reduced. In addition, the opening area of the gas discharge port can be set large, whereby the output properties of the inflator can easily be changed.

DETAILED DESCRIPTION OF THE PREFERRED EMBODIMENTS

Figure 1:
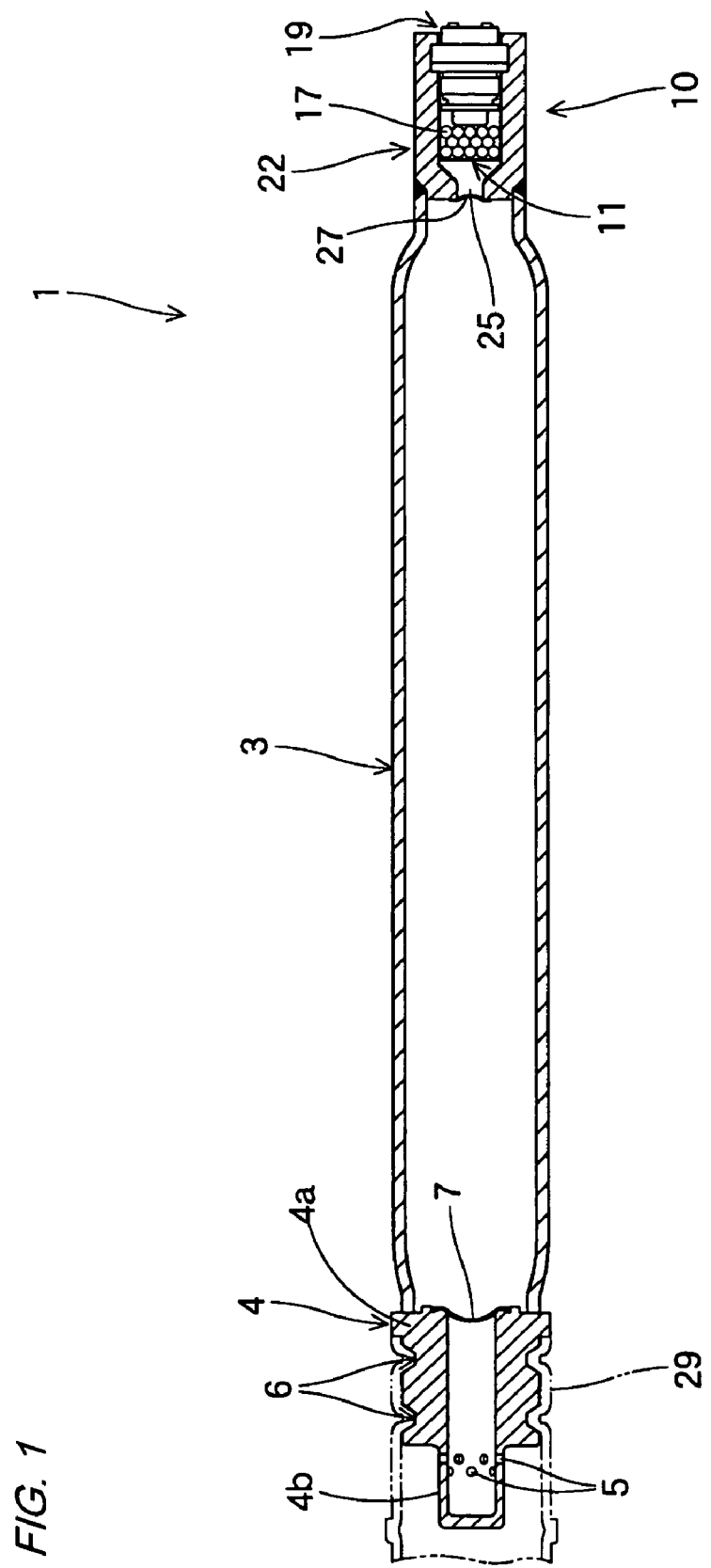
FIG. 1 is a schematic sectional view of an inflator which employs a gas generator which constitutes an embodiment of the invention.

Hereinafter, an embodiment of the invention will be described based on the drawings. In this embodiment, the invention will be described by taking as an example a gas generator which is used as an actuator 10 of an inflator 1 for supplying an inflation gas into an air bag. An inflator 1 of the invention is, as is shown in FIG. 1, formed into a cylinder-type inflator having a substantially cylindrical external configuration and is such as to be used with a diffuser 29 for causing an inflation gas to flow into an air bag, not show, connected to a gas discharge port 5. This gas discharge port 5 will be described later. In the case of this embodiment, the inflator 1 is configured such that a ferrule portion 4 including a gas discharge port 5 is disposed at one end of a substantially cylindrical case portion 3 and an actuator 10 functioning as a gas generator is disposed at the other end.

The case portion 3 is formed of a metallic pipe made of steel and has a substantially cylindrical shape which is opened at both axial ends. These open axial ends are closed by the ferrule portion 4 and the actuator 10, respectively, and a pressurized gas such as a nitrogen gas, a helium gas, an argon gas or a mixture thereof is filled in an interior thereof.

The ferrule portion 4 is formed of a metallic material such as steel and is, as is shown in FIG. 1, disposed so as to close the one end of the case portion 3. The ferrule portion 4 is welded to the case portion 3 along a circumferential edge of a proximal portion 4a so as to be fixed to the case portion and includes a plurality of gas discharge ports 5 provided at a distal end 4b. In the case of the embodiment, in the ferrule portion 4, a portion at the distal end 4b is made smaller in diameter than a portion at the proximal portion 4a, and the gas discharge portions 5 are provided in a large number over the whole area of a substantially cylindrical outer circumferential surface of the ferrule portion 4 at the distal end 4b thereof along a circumferential direction thereof. In addition, in this embodiment, the diffuser 29 is connected to the inflator 1 at a portion lying on the proximal portion 4a of the ferrule portion 4 by a portion of the diffuser 29 which lies on the proximal portion 4a being crimped into recessed grooves 6 which are formed on a portion of the ferrule portion 4 at a portion lying on the proximal portion 4a so as to extend along the full circumference thereof.

In addition, a rupture plate 7 is disposed at the proximal portion 4a of the ferrule portion 4 so as to separate the ferrule portion 4 from the case portion 3, as well as to close the gas discharge port 5 (refer to FIG. 1). This rupture plate 7 is designed to be ruptured when an internal pressure inside the case portion 3 is increased by a combustion gas G being caused to flow out into the case portion, so as to permit a communication between the ferrule portion 4 and the case portion 3 so that an inflation gas is discharged from the gas discharge ports 5, the combustion gas G being generated as a result of combusting of gas generating agents 17 filled within a cup portion 11, which will be described later, of the actuator 10 by a flame generated as a result of ignition of a squib 19, which will be described later, of the actuator 10.

Figure 2:
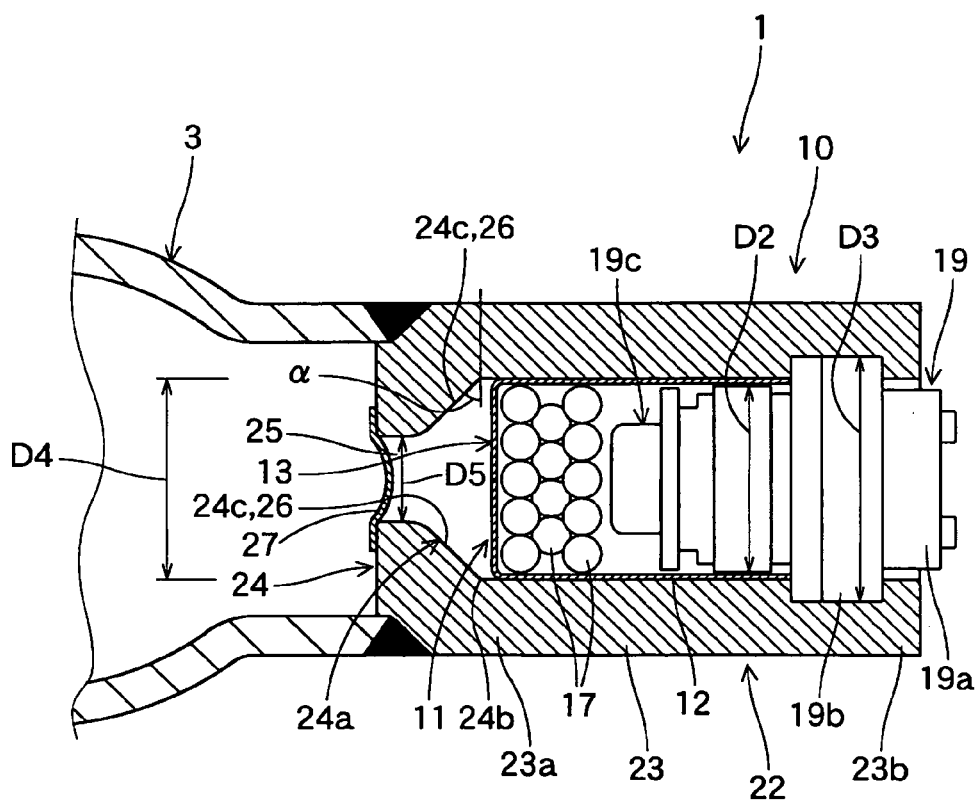
FIG. 2 is a partial enlarged sectional view showing a portion in the vicinity of where an actuator (a gas generator) is located in the inflator shown in FIG. 1.

As is shown in FIG. 2, the actuator 10 functioning as a gas generator is configured to include a housing 22 of which an interior is filled with the gas generating agents 17 which generate gas when combusting, the squib 19 stored within the housing 22 so as to ignite the gas generating agents 17, and the cup portion 11 functioning as a closure member for cutting off the ventilation between the inside and outside of the housing 22.

The squib 19 is accommodated within the housing 22 so as to be connected and fixed to an outer circumferential wall 23, which will be described later, of the housing 22 at predetermined locations at a portion of the housing 22 which lies on a proximal portion of the housing 22 which lies apart from the case portion 3 with a terminal 19a which is formed at a proximal portion of the squib 19 exposed to the outside of the housing 22. This terminal 19a is configured to be connected to a lead wire, not shown. As is shown in FIG. 2, the squib 19 is configured to include a substantially disc-shaped flange portion 19b attached to the housing 22 and an ignition portion 19c which is made smaller in diameter than the flange portion 19b and is formed so as to project from a distal end of the flange portion 19b, and the flange portion 19b and the ignition portion 19c are disposed on a distal end of the terminal 19a. In addition, when the inflator 1 is installed in a vehicle as an air bag unit, the squib 19 is electrically connected to a control unit of the vehicle via a lead wire and is made to be actuated, upon receipt of an actuation signal from the control unit, to generate a flame from the ignition portion 19c, so as to combust the gas generating agents 17 filled in the cup portion 11.

Figure 3:
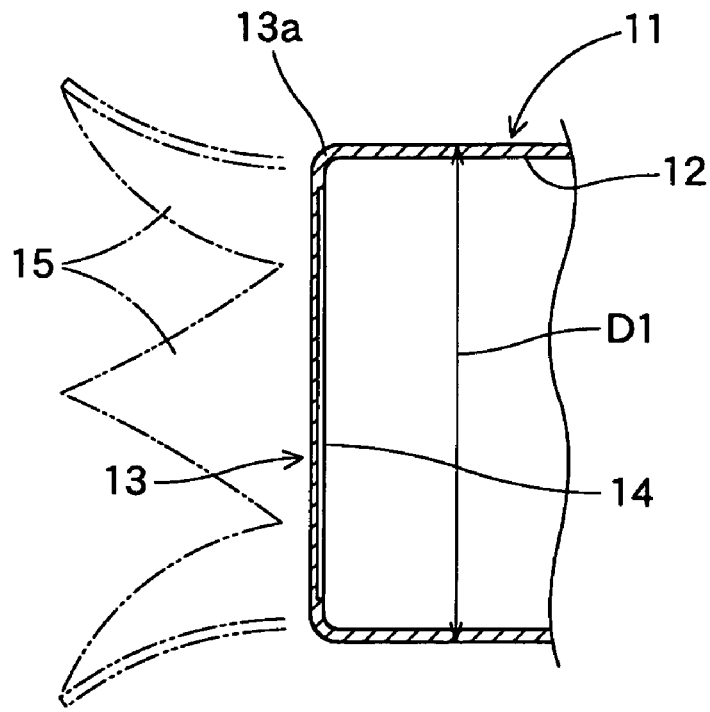
FIG. 3 is a partial enlarged sectional view showing a portion in the vicinity of where a distal end wall portion of a cup portion is located in the inflator shown in FIG. 1.

The cup portion 11 functioning as a closure member is made to cut off ventilation between the inside and outside of the housing 22 (ventilation between the outside of an outlet port 25 and the interior of the housing 22 which accommodates the gas generating agents 17 and the squib 19) so as to close the outlet port 25. In other words, the cup portion 11 is made to cover the interior of the housing 22 over substantially the whole area thereof and is configured to include a substantially cylindrical circumferential wall portion 12 which is made to extend from the squib 19 so as to cover substantially the whole surface of an inner circumferential side of the outer circumferential wall 23 of the housing 22 and a substantially disc-shaped distal end wall portion 13 which is made to face the squib 19 and to close a distal end (a side facing to the case portion 3) of the circumferential wall portion 12. The cup portion 11 is made of a metal such as an aluminum alloy or the like and is made integral with the squib 19 by a proximal portion of the circumferential wall portion 12 being made to be connected to the flange portion 19b of the squib 19. In the case of this embodiment, the cup portion 11 is connected to the outer circumferential wall 23 of the housing via the squib 19. In the case of the embodiment, the cup portion 11 is configured such that an outside diametrical dimension D1 (refer to FIG. 3) of the circumferential wall portion 12 is made slightly larger in diameter than an outside diametrical dimension D2 of the ignition portion 19c so that the ignition portion 19c of the squib 19 can be inserted into the circumferential wall portion 12 and is made slightly smaller in diameter than an outside diametrical dimension D3 of the flange portion 19b of the squib 19 (refer to FIG. 2).

Figure 4:
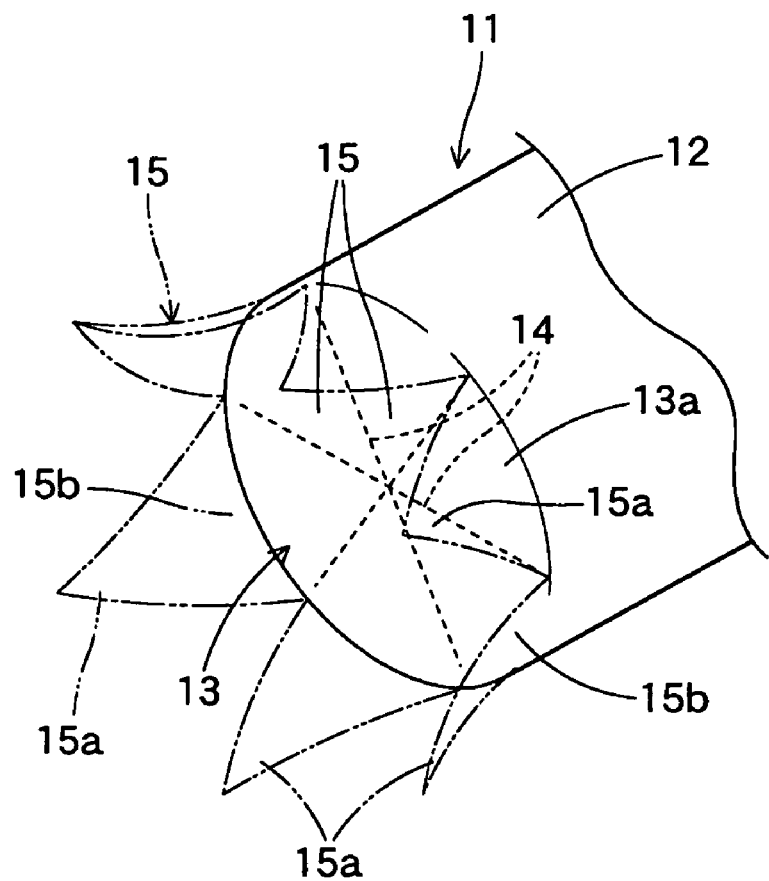
FIG. 4 is a schematic perspective view showing a portion where the distal end wall portion of the cup portion is located in the inflator shown in FIG. 1.
Figure 5:
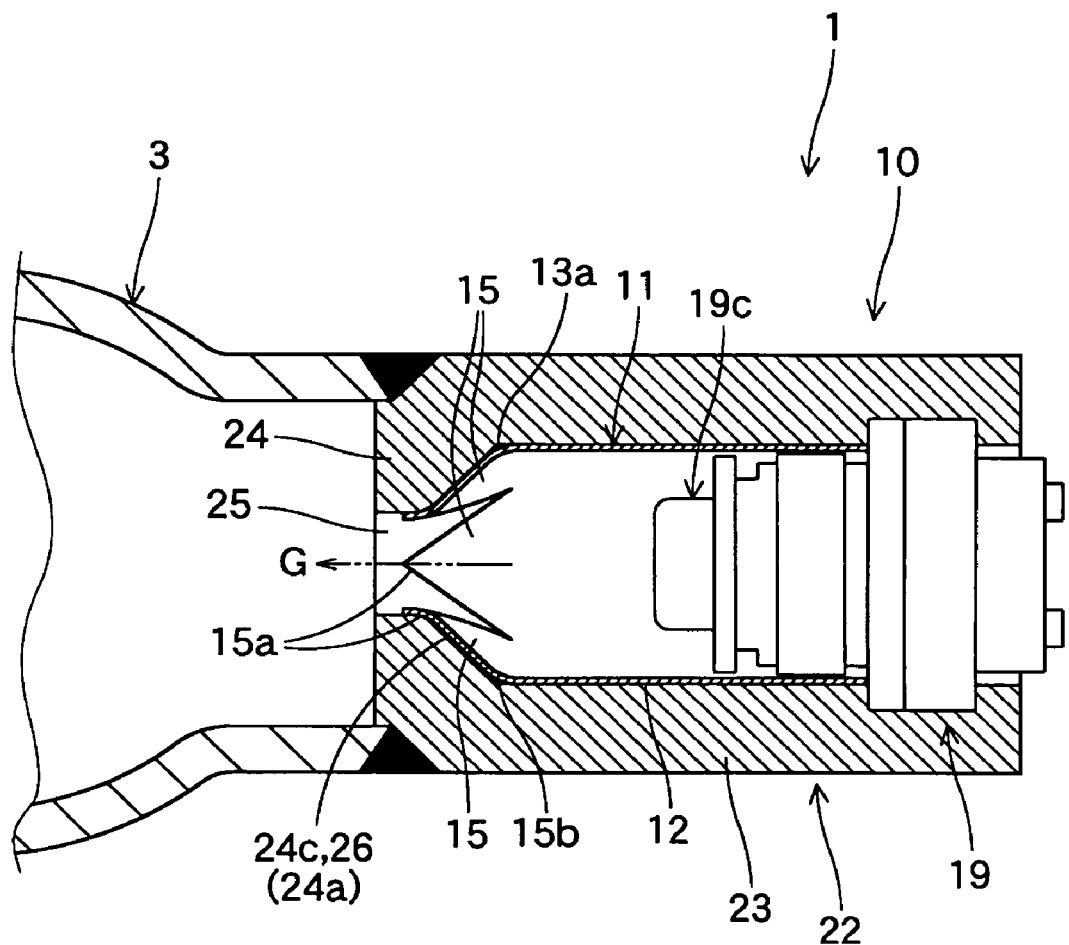
FIG. 5 is a partial enlarged sectional view showing a state in which a squib is activated in the inflator shown in FIG. 1.

Thin breakable portions 14, which is made able to be broken when the squib 19 is activated, are formed on the distal end wall portion 13 of the cup portion 11 so as to extend radially from the center of the distal end wall portion 13 in a rectilinear fashion. In the case of this embodiment, the breakable portions 14 are formed such that cuts whose depth is of the order of ½ of the thickness of the distal end wall portion 13 are provided continuously from an inner surface of the distal end wall portion 13 (refer to FIG. 3), and as is shown in FIG. 4, the breakable portions 14 are formed in a plurality of locations (in the case of this embodiment, six locations) on the distal end wall portion 13 so as to extend radially from the center thereof. To describe in greater detail, the breakable portions 14 are not formed so as to divide or separate the distal end wall portion 13 but are formed such that distal end portions thereof lie slightly further inwards than an outer circumferential edge of the distal end wall portion 13. In addition, portions of the distal end wall portion 13 which lie between the breakable portions 14 are made individually to be opened radially as door portions 15 about positions lying in the vicinity of a boundary line with the circumferential wall portion 12 (positions lying in the vicinity of the outer circumferential wall 23 of the housing 22) as a result of the breakable portions 14 being broken when the squib 19 is activated. Namely, in the case of this embodiment, six door portions 15 are formed, each door portion 15 being formed into a substantially triangular shape, and as is indicated by chain double-dashed lines in FIGS. 3, 4, the door portions 15 are made individually to be opened about positions (proximal portion 15b side) lying in the vicinity of an outer circumferential edge 13a which lies in the vicinity of the outer circumferential wall 23 of the housing 22 (positions lying in the vicinity of the boundary with the circumferential wall portion 12) such that distal ends 15a of the door portions 15 which are situated in the vicinity of the center of the distal end wall portion 13 are directed towards the case portion 3. In addition, in the case of this embodiment, when opened, the door portions 15 are made to be opened such that the distal ends 15a are inserted into the outlet port 25, (refer to FIG. 5).

The gas generating agents 17 are formed by predetermined chemicals, which can generate a combustion gas G when combusting, are molded into a predetermined shape, and in the case of this embodiment, the gas generating agents 17 are formed into a substantially spherical shape and are filled with a space between the cup portion 11 and the squib 19 in the cup portion 11 (in other words, a space between the outer circumferential wall 23 which is situated on the distal end of the squib 19 and a ceiling wall 24 in the housing 22) (refer to FIG. 2).

In the case of this embodiment, the housing 22 is formed of a metallic material such as steel and is configured to accommodate the cup portion 11 and the squib 19 in the interior thereof, the housing 22 being disposed so as to close the other end of the case portion 3. The housing 22 is formed into a substantially cylindrical shape and is made up of the outer circumferential wall 23 which covers completely circumferentially outer circumferential sides of the cup portion 11 and the squib 19 which extend along their circumferential direction and the substantially disc-shaped ceiling wall 24 which covers an outer circumferential side of the distal end wall portion 13 of the cup portion 11 at a distal end 23a (a case portion 3 side) of the outer circumferential wall 23. In the outer circumferential wall 23, the flange portion 19b of the squib 19 is connected to a proximal portion 23b side thereof, and a proximal portion end of the outer circumferential wall 23 which lies apart from the case portion 3 is opened so that the terminal 19a of the squib 19 can be exposed therefrom. In other words, the outer circumferential wall 23 of the housing 22 is configured to extend from the squib 19 which is disposed on the proximal portion 23b side thereof. In addition, the ceiling wall 24 is disposed in such a manner as not only to close the outer circumferential wall 23 but also to face the squib 19. An inside diametric dimension D4 (refer to FIG. 2) of the outer circumferential wall 23 is made slightly larger than the outside diametric dimension D1 of the circumferential wall portion 12 so that the circumferential wall portion 12 of the cup portion 11 can be inserted thereinto. In other words, the outer circumferential wall 23 covers the outer circumferential side of the circumferential wall portion 12 in such a manner as not to provide any space with the circumferential wall portion 12.

The outlet hole 25 is formed substantially at the center of the ceiling wall 24 which is disposed so as to face the squib 19 so that a combustion gas G generated which the squib 19 is activated is allowed to flow out therethrough towards the case portion 3 side. In the case of this embodiment, one outlet hole 25 is formed at the center of the ceiling wall 24, and an inside diametrical dimension D5 thereof is referred to as approximately ⅓ of the inside diametrical dimension D4 of the outer circumferential wall 23. In addition, a stopper portion 26 is formed on a surface (a proximal portion side surface 24a) of the ceiling wall 24 which lies on a distal end wall portion 13 side for restricting the opening of the door portions 15 by the door portions 15 which are opened being made to be brought into abutment therewith such that the opening angles of the individual door portions 15 become less than 90° when the squib 19 is activated. In the case of this embodiment, the proximal portion side surface 24a of the ceiling wall 24 is made to have an inclined surface 24c which is inclined in a substantially conical fashion such that with an outer circumferential edge 24b side positioned in the vicinity of the outer circumferential edge 13a of the distal end wall portion 13 of the cup portion 11, the proximal portion side surface 24a is recessed towards a circumferential edge of the outlet hole 25. In addition, when opened, the opened door portions 15 are made to be brought into abutment with the inclined surface 24c, whereby the door portions 15 are prevented from being opened further, thus, the inclined surface 24c constituting the stopper portion 26. In the case of the embodiment, the inclined surface 24c is configured such that an inclination angle α (refer to FIG. 2) relative to the distal end wall portion 13 of the cup portion 11 (a direction at right angles to an axis of the cup portion 11) is set to 45°. Since an outer circumferential edge 24b of the inclined surface 24c is situated in the vicinity of the outer circumferential edge 13a of the distal end wall portion 13 which constitutes the center of the door portions 15 when they are opened, the opening angles of the door portions 15 coincide substantially with the inclination angle of the inclined surface 24c, and in the case of the embodiment, the door portions 15 are opened at an opening angle of substantially 45°. In addition, in the case of this embodiment, a portion lying in the vicinity of a boundary between the outlet hole 25 and the inclined surface 24c is chamfered into a round shape (a shape having an arc-like cross section) (refer to FIG. 2).

In addition, a rupture plate 27 is disposed on a circumferential edge of the outlet hole 25 in the housing 22 so as to separate the actuator 10 from the case portion 3 (refer to FIGS. 1, 2). This rupture plate 27 is ruptured almost at the same time as the door portions 15 of the cup portion 11 are opened when the squib 19 is activated, so as to establish a communication between the actuator 10 and the case portion 3, so that a combustion gas G generated by the gas generating agents 17 combusting is allowed to flow out into an interior of the case portion 3.

In the inflator 1 of the embodiment, in such a state that the inflator 1 is installed in the vehicle as an air bag unit, when an activation signal is inputted into the squib 19 of the actuator 10 via the lead wire, not shown, the gas generating agents 17 filled within the cup portion 11 combust, so as to generate a combustion gas G. In addition, when the squib 19 is activated, the breakable portions 14 formed in the distal end wall portion 13 of the cup portion 11 are broken, and the door portions 15 are opened as is shown in FIG. 4. Then, the combustion gas G generated by the gas generating agents 17 combusting flows out from spaces produced between the opened door portions 15 into the interior of the case portion 3 via the outlet hole 25, so as to increase the internal pressure within the case portion 3, whereby the rupture plate 7 is ruptured. Then, the combustion gas G generated as a result of the gas generating agents 17 combusting and a pressurized gas filled in the case portion 3 are discharged from the gas discharge ports 5 into an air bag as an inflation gas.

In addition, in the actuator (the gas generator) 10 which is used in the inflator 1 of the invention, since the stopper portion 26 is formed on the ceiling wall 24 of the housing 22 which covers the outer circumferential side of the cup portion 11 as the closure member for restricting the opening of the door portions 15 such that the opening angles of the individual door portions 15 become less than 90°, even though the door portions 15 are made to be opened by receiving the detonation force generated by ignition of the gas generating agents 17 when the squib 19 is activated, the door portions 15 are only allowed to be opened at angles less than 90°. In addition, with the opening angle of less than 90°, centrifugal force can be suppressed, and it becomes difficult for stress to be concentrated to the portion lying in the vicinity of the boundary portion between the door portions 15 and the circumferential wall 12 which boundary portion constitutes the center about which the door portions 15 are opened (the portion lying in the vicinity of the outer circumferential edge 12a of the distal end wall portion 13 and the portion lying in the vicinity of the outer circumferential wall 23). Therefore, the door portions 15 can be prevented from being separated from the circumferential wall portion 12. Because of this, in the actuator (the gas generator) 10 of the inflator 1 of the embodiment, the door portions 15 are opened while ensuring the angle at which the combustion gas G is allowed to flow out. In other words, in the actuator (the gas generator) 10 of the inflator 1 of the embodiment, the stopper portion 26 which is provided on the ceiling wall 24 of the housing 22 prevents the excessive opening of the door portions 15 and does not interrupt the opening of the door portions 15. Therefore, the combustion gas G is allowed to flow out from the outlet hole 25 quickly.

Incidentally, in the event that the door portions 15 are opened at an angle equal to or larger than 90°, a large centrifugal force is applied to the portion lying in the vicinity of the boundary portion between the door portions 15 and the circumferential wall portion 12 which boundary portion constitutes the center about which the door portions 15 are opened, causing a concentration of stress thereat, in the vicinity of the proximal portions 15b of the door portions 15, cuts are propagated from the proximal portion sides of the breakable portions 14, whereby a situation is produced in which all the door portions 15 are separated from the circumferential wall portion 12.

Consequently, in the actuator (the gas generator) 10 of the inflator 1 of the embodiment, the scattering of the door portions 15 of the cup portion 11 as the closure member can be prevented when activated.

In addition, in the actuator of the inflator 1 of the embodiment, while the configuration is adopted in which the six breakable portions 14 are disposed in the distal end wall portion 13 of the cup portion 11 and the six door portions 15 are opened, the numbers of breakable portions and door portions that are to be disposed are not limited to those numbers described in the embodiment, and hence, a configuration may only have to be adopted in which at least two breakable portions are formed so as to intersect each other so that two or more door portions are disposed. In addition, when considering the combustion gas flowing out when the door portions are opened, a configuration is preferably adopted in which four or more breakable portions are formed so that four or more door portions are disposed so as to allow combustion gas to flow out smoothly even with a small opening angle.

Figure 6:
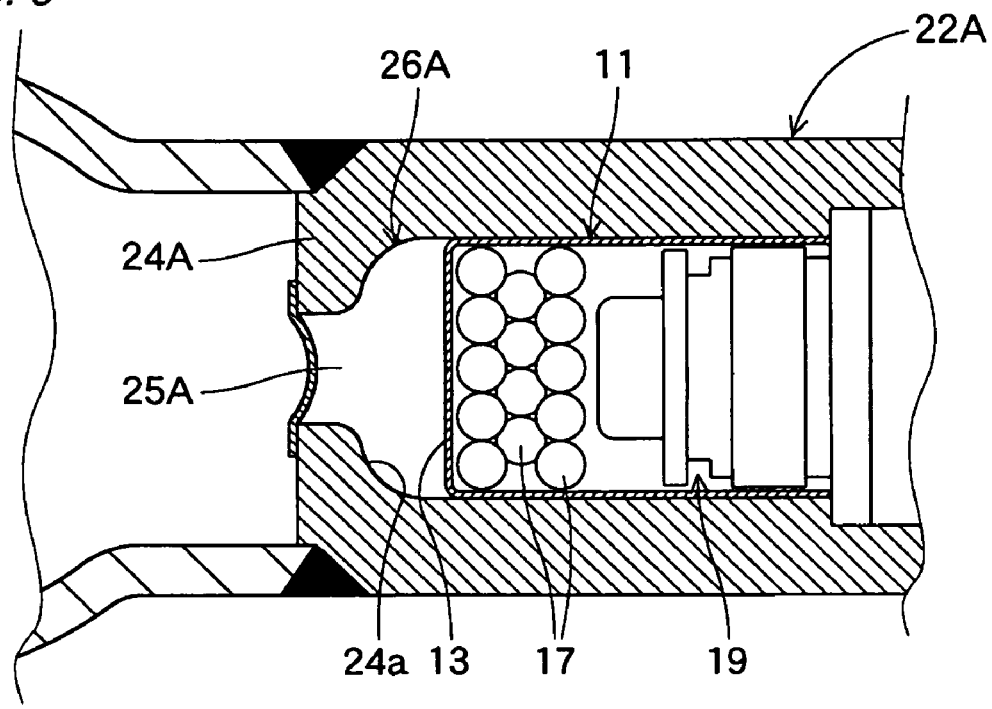
FIG. 6 is a partial enlarged sectional view showing a portion in the vicinity of where an actuator is located in an inflator according to another embodiment of the invention.
Figure 7:
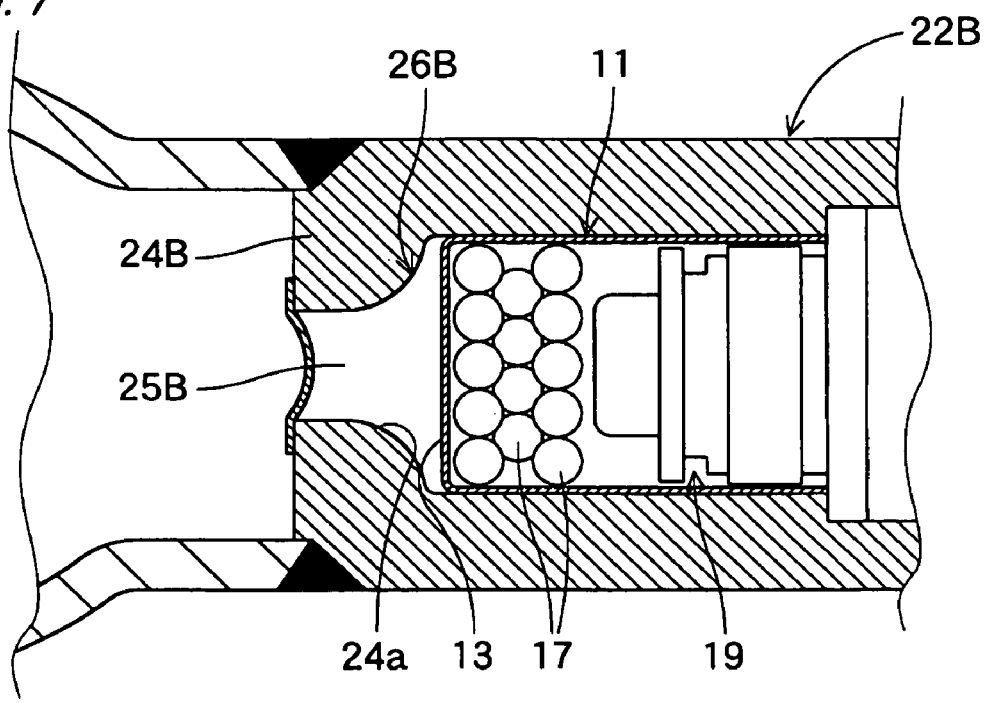
FIG. 7 is a partial enlarged sectional view showing a portion in the vicinity of where an actuator is located in an inflator according to a further embodiment of the invention.

In addition, in the actuator (the gas generator) 10 of the inflator 1 of the embodiment, while the stopper portion 26 is configured such that the proximal portion side surface 24a of the ceiling wall 24 is made up of the inclined surface 24c which is inclined in the substantially conical fashion such that with the outer circumferential edge 24b side positioned in the vicinity of the outer circumferential edge 13a of the distal end wall portion 13 of the cup portion 11, the proximal portion side surface 24a is recessed towards the circumferential edge of the outlet hole 25, the external configuration of the stopper portion is not limited thereto. For example, as is shown in FIG. 6, a housing 22A may be used as a stopper portion 26A which is formed such that a proximal portion side surface 24a of a ceiling wall 24A is curved so as to be recessed in an arc-like fashion from an outer circumferential edge towards an outlet hole 25A. In addition, on the contrary, as is shown in FIG. 7, a housing 22B may be used as a stopper portion 26B which is formed such that a proximal portion side surface 24a of a ceiling portion 24B is curved in an arc-like fashion as viewed in cross section so as to project towards the squib 19 side. Further, the outer circumferential edge of the proximal portion side surface of the ceiling wall does not have to be disposed in the vicinity of the center about which the door portions are opened as described in the embodiment, and hence, the outer circumferential edge of the proximal portion side surface of the ceiling wall may be disposed in a position spaced apart from the center about which the door portions are opened so that the stopper portion is formed on the proximal portion side surface so disposed. In the event that the ceiling wall is configured in the way described above, portions of the door portions lying on the proximal portion which are situated in the vicinity of the center about which the door portions are opened are opened at an angle of 90°. However, since distal end portions of the opened door portions are brought into abutment with the stopper portion, whereby the opening of the door portions are restricted, the whole of the door portions can be prevented from being opened at angles equal to or larger than 90°. Because of this, the application of centrifugal force to the door portions can be suppressed, thereby making it possible to prevent the door portions from being separated from the circumferential wall portion.

In addition, in the inflator 1 of the embodiment, since the door portions 15 can be prevented from being scattered in the cup portion 11 when the squib 19 is activated, fragments of the door portions 15 can be prevented from being permitted to flow out into the interior of the air bag together with the inflation gas which is discharged from the gas discharge ports 5 of the inflator 1. Because of this, in the inflator 1 of the embodiment, the filter can be omitted which is conventionally required for the inflator and is provided in the vicinity of the gas discharge ports 5. In addition, the opening areas of the gas discharge ports 5 can be set large, whereby the output properties of the inflator 1 can easily be changed.

In addition, in the embodiment, while the cup portion 11 which covers the inner circumferential side of the housing 22 over substantially the whole area thereof and of which the interior is filled with the gas generating agents 17 is used as the closure member, the closure member is not limited thereto, and hence, a configuration may be adopted in which gas generating agents are filled directly in the housing and a closure member formed into a thin plate shape and having door portions is disposed between the gas generating agents and the ceiling wall.

Additionally, in the embodiment, while the invention has been described as being applied to the actuator which is used in the hybrid-type inflator as the gas generator, the invention may be applied to, for example, a micro gas generator or the like.

What is clamed is:

1. A gas generator having a housing of which an interior is filled with gas generating agents which generates gas when combusting and a squib stored within the housing for igniting the gas generating agents,
    the housing constructed to accommodate the squib on a proximal portion side and comprising an outer circumferential wall configured to extend from the squib and a ceiling wall adapted to close the outer circumferential wall on a distal end side of the circumferential wall and disposed so as to face the squib, with the gas generating agents filled between the outer circumferential wall lying on a distal end side of the squib and the ceiling wall,
    an outlet hole being formed substantially at a center of the ceiling wall through which combustion gas generated when the squib is activated is allowed to flow out,
    a closure member, which is made able to cut off ventilation between an inside and outside of the housing and breakable when the squib is activated, being disposed so as to close the outlet hole, wherein
    the closure member is thin-walled and is connected to the outer circumferential wall side along a circumferential edge thereof so as to separate the gas generating agents side from the ceiling wall in the interior of the housing, wherein
    thin breakable portions, which are breakable when the squib is activated, are formed in the closure member so as to extend substantially radially from a center thereof in a rectilinear fashion, wherein
    portions of the closure member which lie between the breakable portions are individually made to open as door portions radially about positions in the vicinity of the outer circumferential wall by the breakable portions being broken when the squib is activated, wherein
    a stopper portion is formed on a surface of the ceiling wall which lies on the closure member side so as to restrict the opening of the door portions so that an angle at which the door portions are opened becomes less than 90° while ensuring an angle at which the combustion gas can flow out by the door portions so opened being made to be brought into abutment therewith, wherein
    the closure member includes cup portion made to cover the interior of the housing over substantially the whole area thereof,
    the cup portion includes a substantially cylindrical circumferential portion which is made to extend from the squib so as to cover substantially the whole surface of an inner circumferential side of the outer circumferential wall of the housing, and
    a substantially disc-shaped distal end wall portion which is made to face the squib and to close a distal end of the circumferential wall portion,
    an ignition portion of the squib is inserted to the cup portion and the gas generating agent is accommodated in the cup portion.

2. A gas generator as set forth in claim 1, designed to be used in a hybrid-type inflator having:
    a case portion of which an interior is filled with a pressurized gas for generating an inflation gas for inflating an air bag and which includes a gas discharge port which is closed by a rupture plate; and
    an actuator welded to the case portion and adapted to cause the pressurized gas filled within the interior of the case portion to be discharged from the gas discharge port by rupturing the rupture plate when actuated, as the actuator.

3. The gas generator of claim 1, wherein the cup portion is made integral with the squib by a proximal portion of the substantially cylindrical circumferential wall portion being made to be connected to a flange portion of the squib.

4. The gas generator of claim 1, wherein the thin breakable portions are formed so that distal end portions thereof lie further inwards than an outer circumferential edge of the distal end wall portion.

* * * * *